United States Patent Office 3,367,895
Patented Feb. 6, 1968

3,367,895
VINYL-POLYESTER-OXAZOLINE RESIN REACTION PRODUCT
Edgar L. Clark, Oak Park, Ill., assignor to Commercial Solvents Corporation, a corporation of Maryland
No Drawing. Continuation of application Ser. No. 292,084, July 1, 1963. This application Feb. 28, 1967, Ser. No. 620,209
6 Claims. (Cl. 260—22)

This application is a continuation of application Ser. No. 292,084, filed July 1, 1963, now abandoned.

My invention relates to maleic polyester resins containing stable vinyl groups and their method of preparation.

Maleic polyesters dissolved in styrene have been used extensively for casting or lay-up work where thick layers of resin are employed. Resins of this type have been found to be impractical, however, in uses requiring thin films which are exposed to the air because, under such circumstances the styrene evaporates from the surface of the film. The evaporation of the styrene is particularly noticeable when the films are subjected to any elevation in temperature.

I have now prepared resins containing vinyl groups in which the vinyl groups do not escape from films of the resins even when heated. Also, my novel resins have increased flexibility and adhesive properties as compared to styrene cross-linked maleic polyester resins. The novel resins are useful as molding and coating resins.

The resins of my invention are reaction products of maleic anhydride and certain vinyl-polyester oxazoline products. The vinyl-polyester-oxazoline products are reaction products of formaldehyde and a polyester-oxazoline product of the reaction of tris (hydroxymethyl) aminomethane and an aliphatic dibasic acid of at least 10 carbon atoms having a saturated carbon atom in the alpha position to the carboxyl groups.

The resins of my invention can be prepared by first reacting the aliphatic dibasic acid with tris (hydroxymethyl) aminomethane to produce the polyester-oxazoline product which is then reacted with formaldehyde to produce the vinyl-polyester-oxazoline product. This vinyl-containing product is then reacted with maleic anhydride to produce a vinyl-polyester-oxazoline maleic resin containing vinyl groups and having varying degrees of hardness and flexibility determined by the quantity of maleic anhydride reacted.

In the preparation of the polyester-oxazoline product, tris (hydroxymethyl) aminomethane is reacted with an aliphatic dibasic acid of at least 10 carbon atoms, having a saturated carbon atom in the alpha position to the carboxyl groups, in a molar ratio of about 3 moles of the aminomethane and about 2 moles of acid and at elevated temperature sufficient to convert the amino groups to oxazoline rings. The useful acids include saturated acids of about 10 to about 36 carbon atoms such as sebacic acids, $HOOCCH_2(CH_2)_6CH_2COOH$, and unsaturated acids such as dimerized linoleic acid, both of which possess the required alpha carbon atom, necessary for formation of the vinyl group by reaction with formaldehyde. The dimerized linoleic acid can be pure dilinoleic acid or the commercially available product which includes a minor amount of trimerized acid. While there is no definite and exclusive structural formula for dimerized linoleic acid, it is sometimes represented as follows:

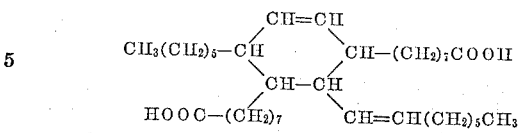

An aliphatic dibasic acid of at least 10 carbon atoms is necessary to give the product the desired properties. With such acids, the product is a heavy viscous liquid and readily handled as such in the further reaction with formaldehyde. Aliphatic dibasic acids of shorter carbon chain length and aromatic dibasic acids give unmanageable products, e.g. hard solids. I have found that a molar ratio of the aminomethane to fatty acid of about 1.5:1, i.e. about 3:2, must be employed to obtain a desirable product. I have found that the employment of lower molar ratios, i.e. of about 2:2, produces an unmanageable gel, apparently because of random cross linking of the components. Temperatures in the range of somewhat above 400° F., e.g. about 440° F., insure that all of the amino groups of the aminomethane are converted into the oxazoline rings. A temperature range of about 425° F. to 475° F. is generally satisfactory. The reaction is believed to proceed generally in accordance with the following equation, in which R in I from the aliphatic dibasic acid contains at least 6 carbon atoms:

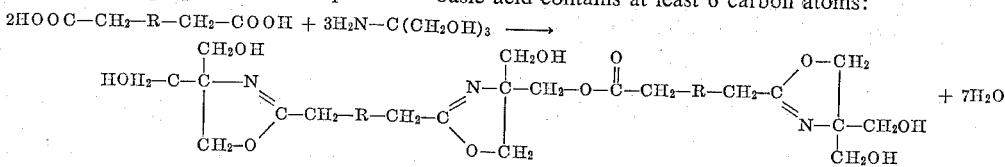

(polyester-oxazoline I)

The extent of the reaction of the acid and the aminomethane can be determined by testing for the acid number of the reaction mixture. Usually when an acid number of less than 4 is obtained, the reaction has been completed to a satisfactory degree.

In the preparation of the vinyl-polyester-oxazoline product, formaldehyde is reacted with the polyester-oxazoline product I in a molar ratio of about 1.5 to 3.5 moles of formaldehyde per mole of polyester-oxazoline product and at elevated temperature. While satisfactory products can be formed by the use of only about 1.5 moles of formaldehyde it is desirable to use about 3 moles since there are three alpha carbon atoms available for reaction for each molecule of the polyester-oxazoline product I produced from the 3:2 molar ratio of the aminomethane and acid. Preferably, a small excess of formaldehyde is used over the molar ratio of 3:1 formaldehyde to the polyester-oxazoline product, e.g. about 3.5:1. Advantageously, as low an elevated temperature as possible is employed in this reaction in order to prevent random reaction of the vinyl groups between molecules which results in unmanageable gels. For example, an unmanageable gel is formed at temperatures of about 500° F. and above. The formaldehyde is preferably added to the polyester-oxazoline at temperatures below about 270° F., before raising the temperature, to prevent the formaldehyde from boiling off. A temperature range of about 250 to 450° F. is generally satisfactory. The reaction time is generally about 3 hours or less and it is preferred to employ a reaction time somewhat shorter than 3 hours in that excessive reaction times tend to create a reaction product which becomes too stiff to handle in the further reaction with maleic anhydride, without the use of solvents. The reaction of the polyester-oxazoline and the formaldehyde is believed to proceed in accordance with the following equation:

Polyester-oxazoline (I) + 3CH₂O ⟶

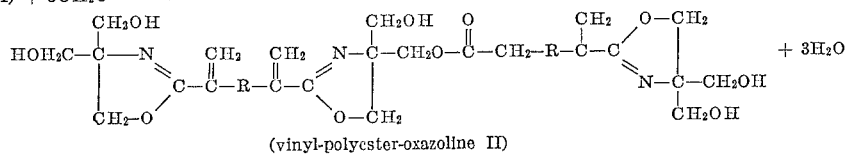

(vinyl-polyester-oxazoline II)

In the preparation of the vinyl-polyester-oxazoline resin, maleic anhydride is reacted with the vinyl-polyester-oxazoline reaction product II in a molar ratio of about 1 to 5 moles per mole of the reaction product and at elevated temperature. This particular reaction is believed to be a fusion in which the maleic anhydride ring opens and reacts with the free hydroxyl groups of the vinyl-polyester-oxazoline product to form the half ester. While the maximum theoretical amount of maleic anhydride that can be reacted per mole of the vinyl-polyester-oxazoline product II is 5 moles since there are 5 free hydroxyl groups available with which the maleic anhydride can react, in actual production I have found that only 4.5 moles of maleic anhydride per mole of the vinyl-polyester-oxazoline compound is all that can be employed in the reaction without leaving a considerable amount of unreacted maleic anhydride in the final reaction product. The amount of maleic anhydride can be varied between about 1 to 5 moles per mole of vinyl-polyester-oxazoline product to achieve varying degrees of hardness and flexibility in the final product, low ratios providing more flexibility and high ratios harder resins. Generally, lower temperatures tend to favor the fusion of the maleic anhydride and the vinyl-polyester-oxazoline product. A temperature range of about 250 to 350° F. is generally satisfactory.

My invention will be further illustrated by the following examples.

EXAMPLE 1

*Polyester-oxazoline reaction product*

In this example tris (hydroxymethyl) aminomethane was reacted with dimerized linoleic acid. The dimerized linoleic acid was a commercial product sold under the trade name "Empol 1018 Dimer Acid" made by Emery Industries, Inc., Cincinnati, Ohio. This product is obtained by dimerization of the linoleic acid available in soya, cottonseed, corn and linseed oils. It typically comprises about 83% dimerized acid, about 17% trimerized acid and a trace of monomeric acid.

A quantity of 365 grams (3 moles) of tris (hydroxymethyl) aminomethane and 1120 grams (2 moles) of "Empol 1018" dimer fatty acid (dimerized linoleic acid) were mixed together and heated slowly to 440° F. Samples of the reaction mixture were removed and tested for acid number. When an acid number below 4 was obtained the reaction of the aminomethane and the fatty acid was substantially complete. The prdouct obtained was a polyester-oxazoline compound and is believed to have the Formula I described above.

The product is a very heavy viscous liquid, flowing slightly at room temperature and flowing freely at elevated temperature. The product is soluble in alcohols, ketones and aromatic hydrocarbons.

EXAMPLE 2

*Vinyl-polyester-oxazoline reaction product*

After the acid number of below 4 was obtained in Example 1, the heat was removed from the polyester-oxazoline product and when the temperature dropped to 275° F., 3.5 moles of formaldehyde, as paraformaldehyde, were added. The temperature was then gradually raised to 390° F. and held there until a cure of 70 seconds was obtained on a 392° F. cure plate. The product was cooled and was a vinyl-polyester-oxazoline compound believed to have the Formula II described above. The product is a soft, flexible resin soluble in alcohols, ketones and aromatic hydrocarbons. A 50% solution of the resin had a Gardner Holt viscosity of "A."

The vinyl-polyester-oxazoline compound obtained in Example 2 was reacted in the following examples with differing quantities of maleic anhydride to produce resins of varying degrees of hardness and flexibility.

EXAMPLE 3

*Maleic-vinyl-polyester-oxazoline resin*

A 100 gram sample (0.074 mols) of the product of Example 2 was heated with 33 grams (0.3 mols) of maleic anhydride to a temperature of 270° F. until a clear, cold pill on glass was formed. At this time 1.5 grams of di-tertiary butyl peroxide was added and then the entire mixture was poured into a mold. Heating at a temperature of 350° F. was continued for one hour. A hard block of resin was formed. The high maleic resin of this example can be used as a potting resin.

EXAMPLE 4

*Maleic-vinyl-polyester-oxazoline resin*

A 100 gram sample (0.074 mole) of the product of Example 2 was heated with 25 grams (0.24 mole) of maleic anhydride to a temperature of 300° F. and was held at this temperature until a 20 second cure time on a 392° F. cure plate was obtained. At this time 120 grams of xylol was added and the mixture was cooled to room temperature. After cooling, 2 grams of benzoyl peroxide dissolved in 10 grams of xylol was added and then 1 gram of 6% cobalt naphthenate was added. The resulting mixture was cast as a 3 mil film on a tin plate and baked for 30 minutes at 350° F. to a tough, mar resistant film. This low maleic resin can be used as a coating resin.

As shown by the above example, the maleic resins of my invention can be prepared so as to have varying degrees of hardness and flexibility ranging from a hard block resin to a tough, mar resistant film depending upon the quantity of maleic anhydride employed. The maleic resins of my invention can be used as molding and coating compositions in a manner similar to known polyester molding and coating resins. The resins can be used in contact molding procedures, e.g. hand lay-up or laminating procedures, in a manner known to the art. In such procedures where thin films are required, they are provided by the resins without loss of vinyl groups unlike the prior styrene based resins. The resins formed from higher amounts of maleic anhydride are particularly useful as potting resins for encasing or encapsulating components sensitive to moisture and other environmental conditions such as for example coils, transformers, circuits, etc. The resins exhibit low shrinkage during polymerization and thus are useful for polymerization in situ in casting procedures where close dimensional tolerances are required. The lower maleic content resins can be advantageously employed as coating compositions for masonry, wood and metal. In such use, the resins are used as vehicles to prepare coating formulations, e.g. paints, lacquers, varnishes, enamels, by inclusion with suitable pigments, driers, solvents, diluents, etc., in a manner known to the art and can be applied in a manner known to art for air curing or force curing, by heat or the use of accelerators. Such coating compositions have good adhesive properties thus further enhancing their value as coating compositions.

I claim:

1. The vinyl-polyester-oxazoline resin reaction product of (a) about 1 to 5 moles of maleic anhydride per mole of (b) the vinyl-polyester-oxazoline reaction product of about 1.5 to 3.5 moles of formaldehyde per mole of the polyester-oxazoline reaction product of tris (hydroxymethyl) aminomethane and an aliphatic dibasic acid of about 10 to about 36 carbon atoms having a saturated carbon atom in the alpha position to the carboxyl groups in a molar ratio of about 3 moles of tris (hydroxymethyl) aminomethane and about 2 moles of acid said reaction of maleic anhydride and vinyl-polyester-oxazoline reaction product being conducted at a temperature of about 250° F. to about 350° F.

2. The vinyl-polyester-oxazoline resin reaction product of (a) about 1 to 5 moles of maleic anhydride per mole of (b) the vinyl-polyester-oxazoline reaction product of about 1.5 to 3.5 moles of formaldehyde per mole of the polyester-oxazoline reaction product of tris (hydroxymethyl) aminomethane and dimerized linoleic acid in a molar ratio of about 3 moles of tris (hydroxymethyl) aminomethane and about 2 moles of acid said reaction of maleic anhydride and vinyl-polyester-oxazoline reaction product being conducted at a temperature of about 250° F. to about 350° F.

3. The product of claim 2 in which the amount of formaldehyde is about 3 moles per mole of polyester-oxazoline reaction product.

4. The method of preparing a vinyl-polyester-oxazoline resin reaction product which comprises reacting tris (hydroxymethyl) aminomethane and an aliphatic dibasic acid of 10 to 36 carbon atoms having a saturated carbon atom in the alpha position to the carboxyl groups in a molar ratio of about 3 moles of tris (hydroxymethyl) aminomethane and about 2 moles of acid to form a polyester-oxazoline reaction product and reacting said product with about 1.5 to 3.5 moles of formaldehyde to form a vinyl-polyester-oxazoline reaction product and reacting said product with about 1 to 5 moles of maleic anhydride at a temperature of about 250° F. to about 350° F.

5. The method of preparing a vinyl-polyester-oxazoline resin reaction product which comprises reacting tris (hydroxymethyl) aminomethane and dimerized linoleic acid in a molar ratio of about 3 moles of tris (hydroxymethyl) aminomethane and about 2 moles of acid to form a polyester-oxazoline reaction product and reacting said product with about 1.5 to 3.5 moles of formaldehyde to form a vinyl-polyester-oxazoline reaction product and reacting said product with about 1 to 5 moles of maleic anhydride at a temperature of about 250° F. to about 350° F.

6. The method of claim 5 in which the formaldehyde is reacted in an amount of about 3 moles.

References Cited

UNITED STATES PATENTS

| | | | |
|---|---|---|---|
| 2,403,533 | 7/1946 | Kuszuba | 260—75 |
| 2,924,571 | 2/1960 | Hughes | 260—307.6 |

OTHER REFERENCES

Shapiro, American Paint Journal, vol. 40 (1956), pp. 70–78.

WILLIAM H. SHORT, *Primary Examiner.*

SAMUEL H. BLECH, *Examiner.*

R. T. LYON, *Assistant Examiner.*